United States Patent [19]
Sharpe et al.

[11] Patent Number: 5,754,941
[45] Date of Patent: May 19, 1998

[54] POINT-TO-MULTIPOINT BROADBAND SERVICES DROP WITH MULTIPLE TIME SLOT RETURN CHANNEL FOR CUSTOMER PREMISES EQUIPMENT SERVED BY FIBER OPTIC TELECOMMUNICATION SYSTEM EMPLOYING STS-BASED TRANSMISSION FORMAT CONTAINING ASYNCHRONOUS TRANSFER MODE CELLS

[75] Inventors: Randall B. Sharpe, Durham; Thomas Joel Long, Cary, both of N.C.

[73] Assignee: Broadband Technologies, Inc., Research Triangle Park, N.C.

[21] Appl. No.: 383,984

[22] Filed: Feb. 6, 1995

[51] Int. Cl.$^6$ .................................................. H04N 7/173
[52] U.S. Cl. ........................... 455/5.1; 348/12; 348/13
[58] Field of Search ........................... 348/6, 7, 8, 9, 348/10, 12, 13; 455/3.1, 4.1, 4.2, 5.1; 370/94.1, 94.2, 94.3, 95.1, 95.3, 110.1; 359/135, 136, 137; H04N 7/173

[56] References Cited

U.S. PATENT DOCUMENTS 5,150,247  9/1992  Sharpe et al. .......................... 359/135
5,481,542  1/1996  Logston et al. ........................ 348/7 X Primary Examiner—John K. Peng
Assistant Examiner—Nathan J. Flynn
Attorney, Agent, or Firm—Charles E. Wands

[57] ABSTRACT

A broadband fiber optic communication system conveys telecommunication messages over a fiber optic link between a master site and one or more remote sites. The remote sites are coupled over an unshielded twisted pair-configured, communication link to an optical network unit, which is ported to the fiber optic link. In order to convey broadband information signals that have been downlinked, from the master site to the optical network unit, to the remote sites, and to provide for return messages from the remote sites, a point-to-multi-point communication scheme is provided. Pursuant to this scheme, an upstream transceiver in the optical interface unit transmits STS-1 frames, which contain broadband information signals, such as asynchronous transfer mode (ATM) data cells, intended for one or more remote sites, and a return time slot-representative control code associated with each destination remote site, over the communication link to the remote sites. At a respective remote site, a downstream transceiver uses the return time slot-representative control code to control its time of transmission over an uplink slotted bus return channel. The remote site also transmits communication signals that encapsulate asynchronous transfer mode data cells. The data in these cells is extracted by the optical network unit and forwarded over the fiber optic link to the master site.

30 Claims, 9 Drawing Sheets

| NAME | FUNCTION |
|---|---|
| A1 | Framing byte ; value 0xf6 |
| A2 | Framing byte; value 0x28 |
| C1 | STS ID; value 0x01 |
| B1 | Even parity BIP8 code for section error monitoring |
| D1 | Data Communication Channel Byte 1 (Metasignaling VPI) |
| D2 | Data Communication Channel Byte 2 (Upper byte of Metasignaling VCI) |
| D3 | Data Communication Channel Byte 3 (Lower Byte of Metasignaling VCI) |
| F1 | User Channel (Used for CPE ID / Slot delineation) |
| H1 | 1st Pointer byte to first byte of SPE (value 0x62) |
| H2 | 2nd Pointer byte (value 0x0A) |
| H3 | Pointer action byte (value 0x00) |
| B2 | Even parity BIP8 code for line error monitoring |
| K2 | Automatic Protection Switch |
| B3 | Even Parity BIP8 code for path error monitoring |
| C2 | Path signal label; value 0x13 |

FIGURE 3

POINT-TO-MULTIPOINT BROADBAND SERVICES DROP WITH MULTIPLE TIME SLOT RETURN CHANNEL FOR CUSTOMER PREMISES EQUIPMENT SERVED BY FIBER OPTIC TELECOMMUNICATION SYSTEM EMPLOYING STS-BASED TRANSMISSION FORMAT CONTAINING ASYNCHRONOUS TRANSFER MODE CELLS

FIELD OF THE INVENTION

The present invention relates in general to fiber optic telecommunication systems, in which a multiplicity of subscriber premises, having one or more pieces of user equipment, such as digital video terminals, are coupled to an optical network interface that terminates a downstream end of a broadband, fiber optic transmission highway, the upstream end of which is coupled to a broadband services master site. The invention is particularly directed to a point-to-multipoint broadband services drop, that couples the optical network interface to customer premises equipment, through which subscribers may request and receive selected television channels or other broadband services, in addition to conducting telephony communications.

BACKGROUND OF THE INVENTION

As described in the U.S. Pat. No. 5,150,247, issued Sep. 22, 1992, to R. Sharpe et al, entitled "Fiber Optic Telecommunication System Employing Continuous Downlink, Burst Uplink Transmission Format with Preset Uplink Guard Band," (hereinafter referred to as the '247 patent, assigned to the assignee of the present application and the disclosure of which is incorporated herein, fiber optic (or fiber-in-the-loop (FITL)) communication systems have been proposed as a broadband replacement for a variety of communication networks, such as traditional 'copper wire' telephony networks and 'add-on' cable television distribution networks (which employ a separate, dedicated coax conductor cable).

Unfortunately, the cost of implementing the systems that have been proposed for broadband networks is relatively high, due to the fact that such schemes often involve the use of a large number of electro-optic and interconnect components, such as source and detector elements. When added to the cost of optical connectors and splices for the fiber optic links, and the quantity of optical fiber itself in the distribution cable between opposite ends of the link, such a large number of components severely impacts overall system expense. As a result, on a per-subscriber basis, the aggregate cost of the components is a large fraction of the price tag of an overall system, which, in addition to employing two transmitter/receiver pairs per subscriber, customarily uses a separate, dedicated pair of optical fibers within the distribution cable for each subscriber.

To reduce such a costly outlay for fiber optic components needed for the system, one approach has been to design signal processing and communication architectures that can handle a very large number of subscriber lines per unit and employ a highly compressed data format. Unfortunately, such an approach is effectively self-defeating since, in order to spread out the cost of the fiber optic components over a large number of subscribers, the system architecture becomes highly complex and therefore aggravates the cost problem, rather than alleviating it.

To solve this problem, the fiber optic telecommunication scheme described in the '247 patent employs a time division multiplex communication scheme in which plural television and telephony signals are transmitted in a continuous time division format in the downstream direction, while channel selection requests and telephony signals from the customer premises equipment are transmitted in the upstream direction in a slotted burst format.

More particularly, referring to FIG. 1, which as diagrammatically illustrates the '247 patent approach, a host digital terminal (HDT) at a master site 10, to which both telephony and video signals are supplied, is linked to a plurality of remote, geographically separated subscriber sites by means of a fiber optic cable pair 20. Downstream-directed telecommunication messages (containing both telephonic signals, such as those supplied by way of a central office switch 14 via a link 12, and encoded television channel-representative digital signals 18, supplied via a link 16) are transmitted in a continuous-mode time division multiplex format over a first optical fiber 21 from the host digital terminal at the master site 10 to a downstream-located splitter site 23.

Splitter site 23 includes a multiple fan-out, optical splitter device 26 located at a first common 'split' point on the downlink fiber 21, and multiple feed-in optical combiner device 27 located at a common 'combine' point on a second, uplink fiber 22. Through these fiber coupling connections within the splitter site, the downlink and uplink fiber pair 21, 22 are coupled by respective downlink and uplink fiber links 24, 25 to a plurality of subscriber interface optical network units 30, that service one or more associated subscriber premises 40 through associated broadband service drops 35.

The respective broadband signals (e.g., television channels) within downlink-directed digitally formatted telecommunication signal frames, that are transmitted over the downlink fiber 21 from the master site 10, correspond to those channels that have been selected in response to subscriber channel requests, contained within uplink burst messages that have been transmitted over the uplink fiber 22 from the customer premises equipments. Each downlink message identifies the optical network unit 30 for whom the message is intended and specifies which digital subscriber line packets are directed to it. The recipient optical network unit 30 demultiplexes the contents of the message and routes the respective broadband signals and telephony signals to customer premises equipment (CPE), such as a TV set top decoder 41 associated with television set 43, telephone handset (not shown), etc., at the destination site 40.

Upstream-directed, burst transmissions from the customer premises equipment to the master site occur in time division multiple access format. Within preassigned time slots of successive uplink burst cycles, the subscriber sites are given the opportunity to transmit a digital data packet containing samples of telephony channels. Each uplink burst cycle may contain additional time slots that are accessible by the subscriber interface sites on a contention basis, for network control and broadband service-related signalling.

Now although the communication scheme described in the '247 patent offers a significant improvement over previously proposed broadband systems, the exemplary continuous time division multiplex format it uses for downstream-directed messages, and the slotted burst upstream format it uses for upstream-directed messages may not necessarily be employed or preferred by all service providers. Indeed, since the inception of the '247 patent scheme, the broadband communications industry has devised internationally accepted standards that are well suited for the transport of a wide variety of data types, in particular synchronous optical network transport (SONET)

stream (STS)-based transmissions, in which asynchronous transfer mode (ATM) data cells may be conveyed.

SUMMARY OF THE INVENTION

In accordance with the present invention, I have modified the system described in the '247 patent to extend the use of such internationally accepted standard communication formats, specifically, the use of a point-to-multipoint asynchronous transfer mode (ATM) transport standard, in which an ATM cell-encapsulated STS-based signal is broadcast to a plurality of customer premises equipments, with a selected portion of an STS-1 frame being used to provide a timing reference through which associated CPEs along a multipoint drop are provided with uplink burst transmission opportunity. The logical frame structure of an STS-1 frame includes a multibyte transport overhead portion comprised of a line overhead portion and a section overhead portion. Within the section overhead portion is an F1 byte that is available for user defined purposes. The F1 byte is used by each of a respective optical network unit and circuitry in the customer's equipment as a reference for the slotted bus return channel.

The transport overhead portion of an STS-1 frame is followed by a synchronous payload envelope (SPE). Point-to-multipoint asynchronous transfer mode (ATM) transport cells are encapsulated in the SPE of the STS-1 frame. The format of the slotted bus return channel is such that each of a plurality of STS-1 frames is divided into a prescribed number of time slots sufficient to accommodate upstream signalling traffic from multipoint drops. The data rate of the uplink-directed channel is sufficiently large that an asynchronous transfer mode cell and associated overhead can be transmitted during a respective one of the time slots.

As in the system described in the '247 patent, the distance between an optical network unit and respective CPEs will differ from node to node, so that the propagation time of the timing reference from the optical network unit to a CPE will differ for each CPE, and the same transmission offset occurs for the return channel. To prevent collisions on the return channel of other CPEs, a guard band is inserted at the front end of successive time slots on the uplink channel. The guard band is sized to accommodate the worst case round trip propagation time difference between CPEs and includes provision for some variability in CPE latency.

The front end of a respective data segment of an uplink slotted return burst includes a burst header, followed by a multi-byte ATM cell header, an ATM cell payload segment and an error-monitoring, binary interleaved parity byte (BIP8). The return channel burst header includes a prescribed binary pattern preamble used by the receiver for phase alignment, a synchronizing byte (sync word), and other information for link management.

The ATM-based point-multipoint broadband drop return channel control mechanism of the present invention takes advantage of internationally accepted protocols and signalling formats, whose standards organizations have defined a layered interface model, having physical/electrical (PHY) and ATM layer portions. The PHY layer provides the electrical interface, framing, synchronization and access functions of the interface, while the ATM layer executes packet segmentation and reassembly. The ATM Forum standards committee has defined an interface between the PHY layer and ATM layers called the Universal Test and Operations PHY Interface for ATM (UTOPIA), which will support multiple PHY layers from a common ATM layer.

Pursuant to the invention, the optical network unit of the system of the '247 patent is modified to provide for an ATM cell-embedded signalling format. The downlink end of the optical network unit, which is interfaced with an optical receiver coupled to the downlink fiber link from the splitter site, is applied to a demultiplexer, which demultiplexes the telephony and control channels to a telephony/control demultiplexer portion or a mux/demux unit and the ATM cells to an ATM interface.

The ATM cells arriving at the ATM interface are filtered, buffered and applied to the UTOPIA bus with associated cell routing information based on the ATM cell address. One or more of the plurality of PHY units also attached to the UTOPIA bus may receive the cell based upon the associated cell routing information. The ATM interface provides upstream or return channel-directed signals to an upstream multiplexer portion of the mux/demux unit. The output of the upstream multiplexer is coupled to the optical transmitter driving the upstream transmit fiber.

Within the physical interface board, the PHY unit is coupled to a UTOPIA interface and provides a physical interface for ATM cell streams. The PHY unit is bidirectionally coupled through respective transmit and receive filters to a hybrid circuit which allows two-way transmission over a single unshielded twisted pair (UTP). The receive filter rejects noise and interference in the received signal, while the transmit filter band-limits the transmit signal.

A respective PHY unit comprises an upstream (relative to the UTP) transceiver having a rate-adaptive, transmit first-in, first out (FIFO) buffer, to which the incoming broadband services drop ATM data stream from the UTOPIA interface is coupled. This elastic buffer is read out at a rate related to the ports's output data rate. A read clock signal is sourced from a timing generator, while a read enable signal is derived from an STS-1 framing unit. The timing generator receives an STS-1 reference clock from the UTOPIA interface. A multiplexer receives ATM cells from the transmit FIFO with an associated start of cell indication. A second input to the multiplexer receives an 'empty' cell that is stored in an auxiliary store, should there be no cell queued in the transmit FIFO. The multiplexer also generates and inserts a cell header in the form of a header error correction code (HEC).

The ATM cell payload output of the multiplexer is scrambled to prevent false cell detection in the receiver of the customer premises equipment. The scrambled ATM data cells are then inserted into an STS-1 frame by an STS-1 framer. A timeslot counter, which is referenced to a subdivided framing clock, provides a timing signal for the insertion of a user-definable F1 byte into the STS-1 frame.

As pointed out above, the F1 byte is used as a time slot assignment identifier for the slotted bus return channel from the CPE equipment. The STS-1 frame then scrambled by a SONET frame synchronous scrambler and coupled to a carrierless amplitude modulation, phase modulation (CAP) encoder for transmission over the UTP to the customer premises equipment.

On the receive side of the ONU's PHY transceiver unit, the output of the receive filter is coupled to a CAP decoder, which demodulates a received CAP-modulated signal burst from the customer premises equipment during the active slot times on the return, uplink channel. The scrambled return channel burst from the CPE is descrambled and applied to a burst demultiplexer, which demultiplexes the ATM cell from the return channel burst overhead. Demultiplexed portions of the burst header are coupled to associated header data registers, the contents of which are monitored by a control microprocessor. A cell router/filter unit routes ATM data cells within the received return channel burst to a receive FIFO which, like the ONU's transmit FIFO, is read by signals from the UTOPIA interface.

The communication unit contained in the customer premises equipment, such as a television set top box, is also modified to provide for the above-described ATM cell-embedded STS signalling format. The downlink end of the UTP or coax is ported to a hybrid circuit to allow two-way transmission over the cable. As in the optical network unit, a receive filter rejects out-of-band energy from the received signal, while a transmit filter conditions the transmitted signal to excise potentially interfering out-of-band emissions. The output of the receive filter is coupled to a downlink (relative to the UTP or coax), CPE-resident PHY transceiver unit. The CPE's PHY unit is coupled via a UTOPIA interface to an ATM signal processing unit. The output of the ATM unit is coupled to a broadband interface device, such as a Moving Pictures Experts Group (MPEG) decoder, for driving associated video equipment.

Like the ONU's (upstream) PHY transceiver unit, the CPE-resident (downstream) transceiver PHY unit comprises a CAP decoder which demodulates the received (16 CAP) modulated broadband data stream from the upstream optical network unit, and couples the recovered clock to various circuit components, including a clock divider, which generates a subdivided clock for use in generating return channel slotted bursts. The received data stream is coupled to an STS-1 framer, which frames on the received SONET frame and performs a bit interleaved parity (BIP8) check on the data. A count is maintained of any errors.

The STS-1 framer is referenced to the recovered clock and provides a receive byte clock to downstream signal processing components. The scrambled SONET data frame is coupled to an STS-1 descrambler, which descrambles the downlink signal and couples the descrambled signal to an F1 byte detector. The F1 byte detector extracts the F1 byte from the descrambled STS-1 frame overhead and couples the detected F1 byte to an F1 byte comparator. This comparator uses the F1 byte to control the operation of the slotted return channel.

The data frame is further coupled to an ATM cell payload processor, which employs pointers in the STS-1 overhead portion to identify the SONET synchronous payload envelope that contains the actual (ATM) data payload. The data payload is then descrambled and coupled the to a receive FIFO, which is controlled by signals on the UTOPIA interface. The ATM data cell output of the receive FIFO is coupled to the UTOPIA interface for application to the ATM cell processing unit of the CPE equipment.

For the return channel through which the customer may make a television channel selection, for example, a rate-adaptive, transmit FIFO is coupled to receive ATM cells from the UTOPIA interface. A read clock for the transmit FIFO is sourced from a clock divider referenced to the recovered clock on the receive side, while a read enable signal is derived from the F1 byte comparator. The data output path of the transmit FIFO is coupled to a logic circuit which generates and insert a cell header in the form of a header error correction code (HEC). The HEC insertion logic is coupled to a cell encapsulation unit which assembles an uplink return time slot including overhead. A bit error indication is coupled to the cell encapsulation unit as part of the performance monitoring status byte that contains information relating to the condition of the CPE.

The output of the cell encapsulation unit is coupled to an ATM self-synchronous scrambler, which scrambles the ATM cell payload to prevent false cell detection in the receiver contained in the customer premises equipment. The output of the self-synchronous scrambler is coupled to a CAP encoder (e.g. a 4 CAP encoder), which is clocked by a subdivided clock signal derived from the recovered clock and is enabled by a transmit enable signal supplied from the comparator.

As noted above, in accordance with the present invention, the F1 byte is employed as a time slot identifier for the slotted bus return channel from the CPE access equipment. In response to detecting the F1 byte, the F1 byte comparator provides a transmit enable signal to control the time of occurrence of the return time slot on the uplink channel. Thus, the 4 CAP uplink slotted transmissions occur in bursts that are controlled by the detected F1 byte in the downlink STS-1 frame.

The time of occurrence of the transmit enable signal generated by the comparator is derived by the coincidence of the CPE ID received in the F1 byte with the local CPE ID assigned in the CPE initialization phase. The output of the 4 CAP encoder is coupled through a driver to a transmit filter for application to the unshielded twisted pair or coax via the hybrid circuit.

Acquisition of the initial time slot may be accomplished by setting aside one of the time slots of the return channel to initial time slot contention, using, for example, an Aloha contention scheme. Dedicating a time slot for contention prevents a newly connected CPE from interfering with an already in-service CPE. Once the newly attached CPE acquires a time slot, then that assigned time slot may by used to request additional time slots as necessary. The point-to-multipoint communication mechanism of the present invention is flexible enough to accommodate existing service drops over which signals from a variety of service providers may be supplied.

For this purpose, a diplexer may be employed to interface the unshielded twisted pair of the link from the optical network unit with telephony and cable television signalling ports typically provided at a customer premise. The frequency diversity diplexer has a first upstream port to which the UTP from the optical network unit is connected, and a second upstream port to which coaxial cable used by a cable television service provider to deliver analog cable television signals to the customer premise is connected. The diplexer also includes a first downstream, telephony signal port to which a twisted pair for customer premises telephone equipment may be connected. It additional includes a second downstream, coaxial cable port to which a television set top box or standard cable-ready television set may be connected.

The diplexer is operative to couple both downstream-directed 16 CAP modulated STS-1 based communication signals received over the unshielded twisted pair from the optical network interface and analog cable television signals to its downstream broadband coaxial cable output port. This coaxial cable port may be coupled to a coaxial cable fan-out connector unit, to provide multiple coaxial cable feeds to more than one piece of customer equipment, such as a set top box, VCR and a cable-ready television set. The diplexer may also be operative to couple telephony signals received over the link pair from the optical network unit to its downstream telephony port.

In the upstream direction, the diplexer couples both upstream-directed 4 CAP modulated ATM cell slotted bus communication signals from the CPE-resident PHY unit of a set top box and telephony signals applied to the unshielded twisted pair. The frequency spectrum separation of downlink directed 16 CAP and upstream-directed 4 CAP communication signals is such that they are both separated below the band of analog cable television signals supplied by a cable television service provider.

BRIEF DESCRIPTION OF THE DRAWINGS

FIG. 3 shows a Table 1 which lists definitions for a transport overhead portion of the STS-1 frame of FIG. 2;

DETAILED DESCRIPTION

Figure 1:
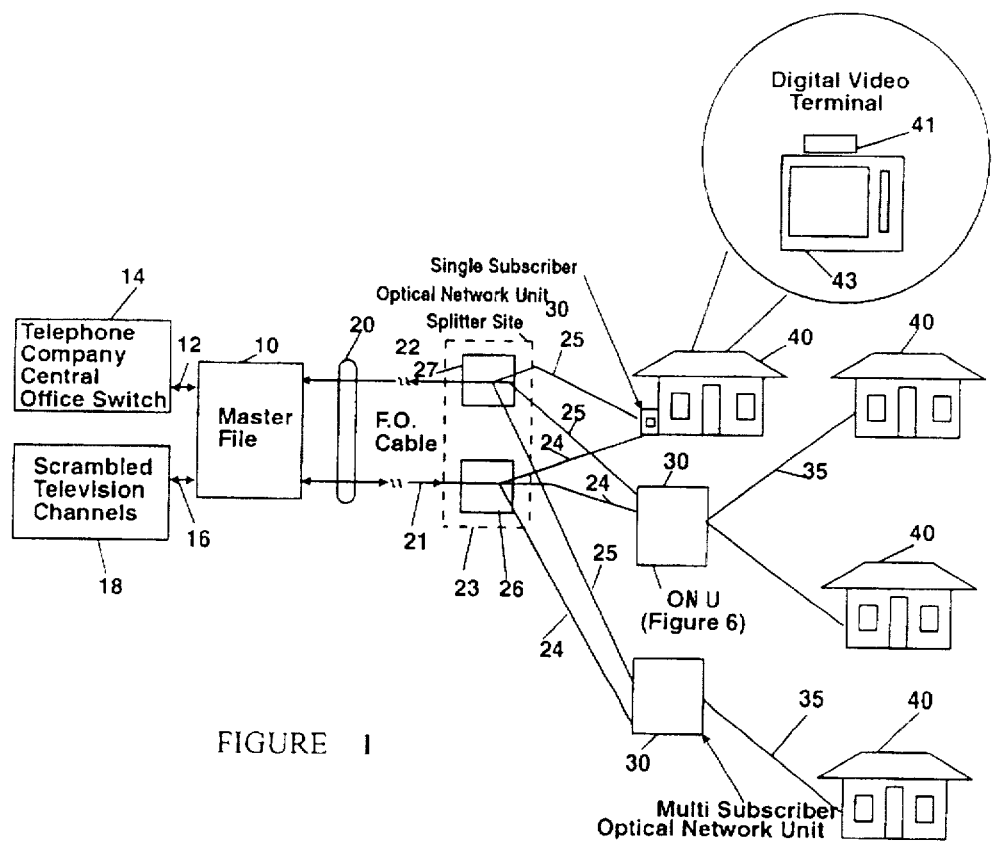
FIG. 1 diagrammatically illustrates a broadband fiber optic telecommunication system as described in the U.S. Pat. No. 5,150,247 to Sharpe et al.

Before describing in detail the ATM cell-embedded STS-1 based point-to-multipoint broadband services drop in accordance with the present invention, it should be observed that the present invention resides primarily in what is effectively a modification of prescribed hardware subsystem components and associated control software of the system described in the above-referenced '247 patent. Consequently, the configuration of the components of the system and the manner in which they are interfaced with other communication equipment of the telecommunications network have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

Figure 2:
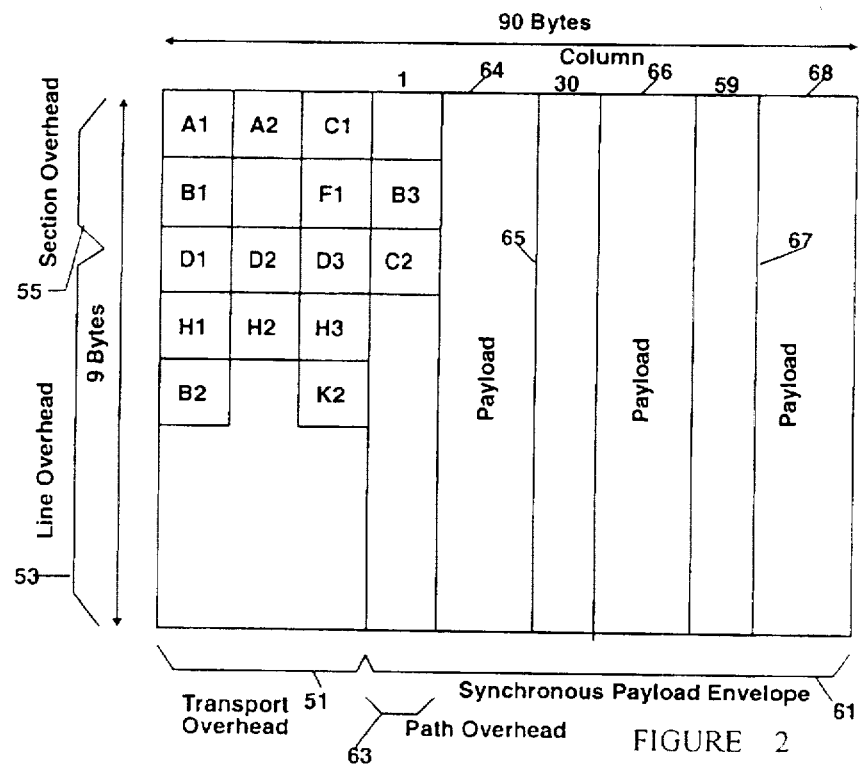
FIG. 2 diagrammatically illustrates the logical structure of an STS-1 frame.

As pointed out briefly above, an STS-1 frame, the logical frame structure of an individual one of which is diagrammatically illustrated in FIG. 2, includes a multibyte (nine byte by three byte) transport overhead portion 51 (definitions for which are set forth in Table 1, shown in FIG. 3), comprised of a (nine byte) line overhead portion 53 and a section overhead portion 55 (eighteen bytes). Within the section overhead portion 55 is an F1 byte that available for user defined purposes. As will be described, the F1 byte is employed by a respective optical network unit 30 as a reference for the slotted bus return channel.

The transport overhead portion 51 is followed by a synchronous payload envelope (SPE) 61, the front end of which is a (nine byte) path overhead portion 63 (definitions for which are also set forth in Table 1), which is followed a plurality of payload segments 64, 66 and 68, which are separated by fixed stuff portions 65 and 67. For the illustrated 86 byte-by-9 byte payload section, there are 756 out of the 784 bytes available for data. It is within this SPE payload section that point-to-multipoint asynchronous transfer mode (ATM) transport standard cells may be transported. For the frame structure shown in FIG. 2, the bytes are transmitted left-to-right, top-to-bottom. The bits of each byte are sent in the order of most significant to least significant.

Figure 4:
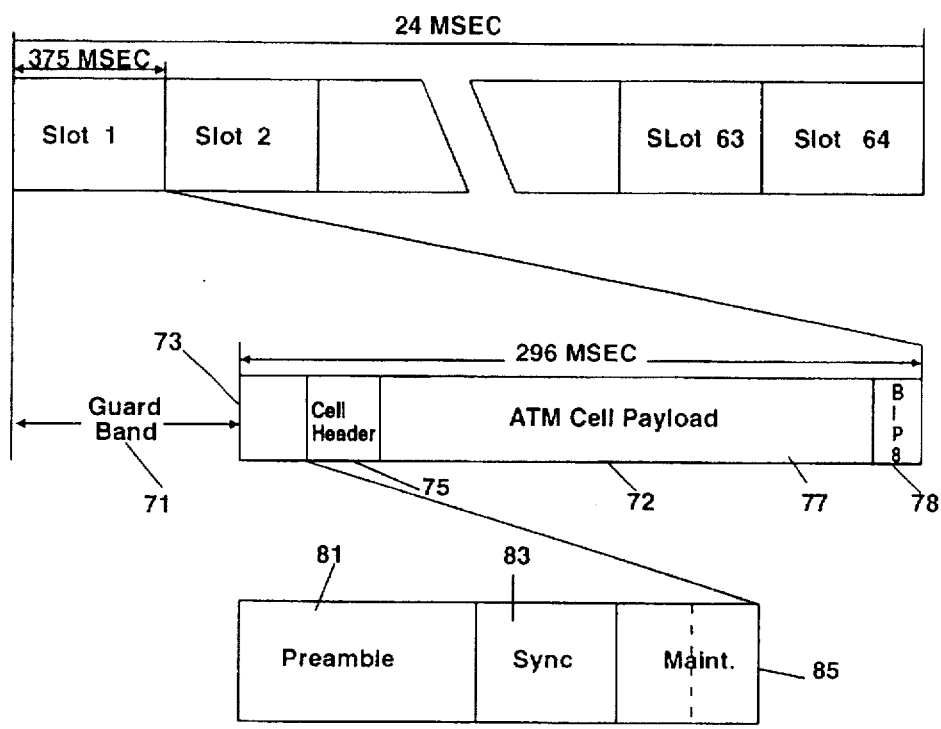
FIG. 4 diagrammatically illustrates the format of the slotted bus return channel generated by an optical network unit in accordance the received STS-1 data stream incoming on the downstream end of the fiber optic link.

FIG. 4 diagrammatically illustrates the format of the slotted bus return channel that is generated by an optical network unit in accordance the received STS-1 data stream incoming on the downstream end of the fiber optic link. In a slotted bus network, the cycle or repetition time interval of the slotted bus format is divided into some prescribed integral number of time slots; nodes along the slotted bus (in this case, the CPEs) are permitted to transmit during prescribed ones of the available time slots. While a variety of mechanisms for controlling access to the bus are available, such as Aloha, Slotted Aloha Reservation Aloha, and Packet Reservation Multiple Access (PRMA), the latter scheme is preferred, since nodes that have acquired a time slot retain that slot until finished transmission and thereby have guaranteed capacity. Unassigned time slots may be contended for providing on-demand bandwidth.

For purposes of providing a non-limiting example, the period of an incoming STS-1 frame will be considered to be 125 μsec. Using an illustrative cycle period of 24 milliseconds, 192 STS-1 frame periods will be available for the return channel. The cycle period may be divided into a practical number of time slots TS1 ... TSN to accommodate upstream signalling traffic from multipoint drops. Using N=64 time slots TS1–TS64 as a non-limiting example results in each time slot comprising three STS-1 frame periods having a duration of 375 μsec.

The data rate of the uplink channel should be sufficiently large that an asynchronous transfer mode cell and associated overhead can be transmitted during a respective one of the 64 time slots. For this purpose, the uplink channel data rate may be established at a prescribed fraction of the STS bit clock rate of 51.84 MB/s, e.g. 1/32 of the clock rate, to provide an uplink slotted data rate of 1.62 Mb/s.

As described in the '247 patent, the distance between the optical network unit and respective CPEs will differ from node to node, so that the propagation time of the timing reference derived from the downlink STS signal by the optical network unit and forwarded to a CPE will differ for each CPE. The same transmission offset occurs for the return channel. To prevent collisions on the return channel of other CPEs, a guard band 71 is inserted at the front end of successive time slots on the uplink return channel. The duration of the guard band 71 is established in accordance with the largest differential transmission distance over the link between the optical network unit and the CPEs. Namely, the guard band 71 is sized to accommodate the worst case round trip propagation time difference between CPEs, and includes provision for some variability in CPE latency. For the parameters of the present example, providing a guard band duration of 79 μsec will permit an ATM cell data burst segment duration of 296 μsec, or 60 bytes of ATM cell data per return channel time slot.

The front end of a respective 296 μsec data segment 72 is shown in FIG. 4 as comprising a burst header 73, which is followed by a (five byte) cell header 75, an ATM cell payload segment 77 and a binary interleaved parity byte (BIP8) 78. Burst header 73 includes a (three byte) preamble 81, which is a prescribed binary pattern used by the receiver for phase alignment. The burst header is followed by a synchronizing byte or sync word 83, and two other bytes 85 for link maintenance or other functions. The BIP8 byte is employed for error monitoring. The ATM cell payload segment 77 provides for 48 bytes of data, thereby yielding the above return channel total of 60 bytes per time slot.

As noted briefly above, the point-to-multipoint broadband drop return channel control mechanism of the present invention is ATM-based and takes advantage of internationally accepted protocols and signalling formats, whose standards organizations have defined a layered interface model, the physical/electrical (PHY) and ATM layer portions of which being described below. The PHY layer provides the electrical interface, framing, synchronization and access functions of the interface, while the ATM layer executes packet segmentation and reassembly (packetization). A standards committee, known as the ATM Forum, has defined an interface between the PHY layer and ATM layers called the Universal Test and Operations PHY Interface for ATM (UTOPIA). A UTOPIA interface will support multiple PHY layers from a common ATM layer. As non-limiting examples, standard ATM interfaces may employ STS-3c, DS3, STS-1 100 Mb/s multimode fiber (an FDDI physical layer), DS2, and 25.92 Mb/s. An eight bit UTOPIA interface can support up to a 155 Mb/s data transfer rate, while a sixteen bit interface can support higher data transfer rates.

Figure 5:
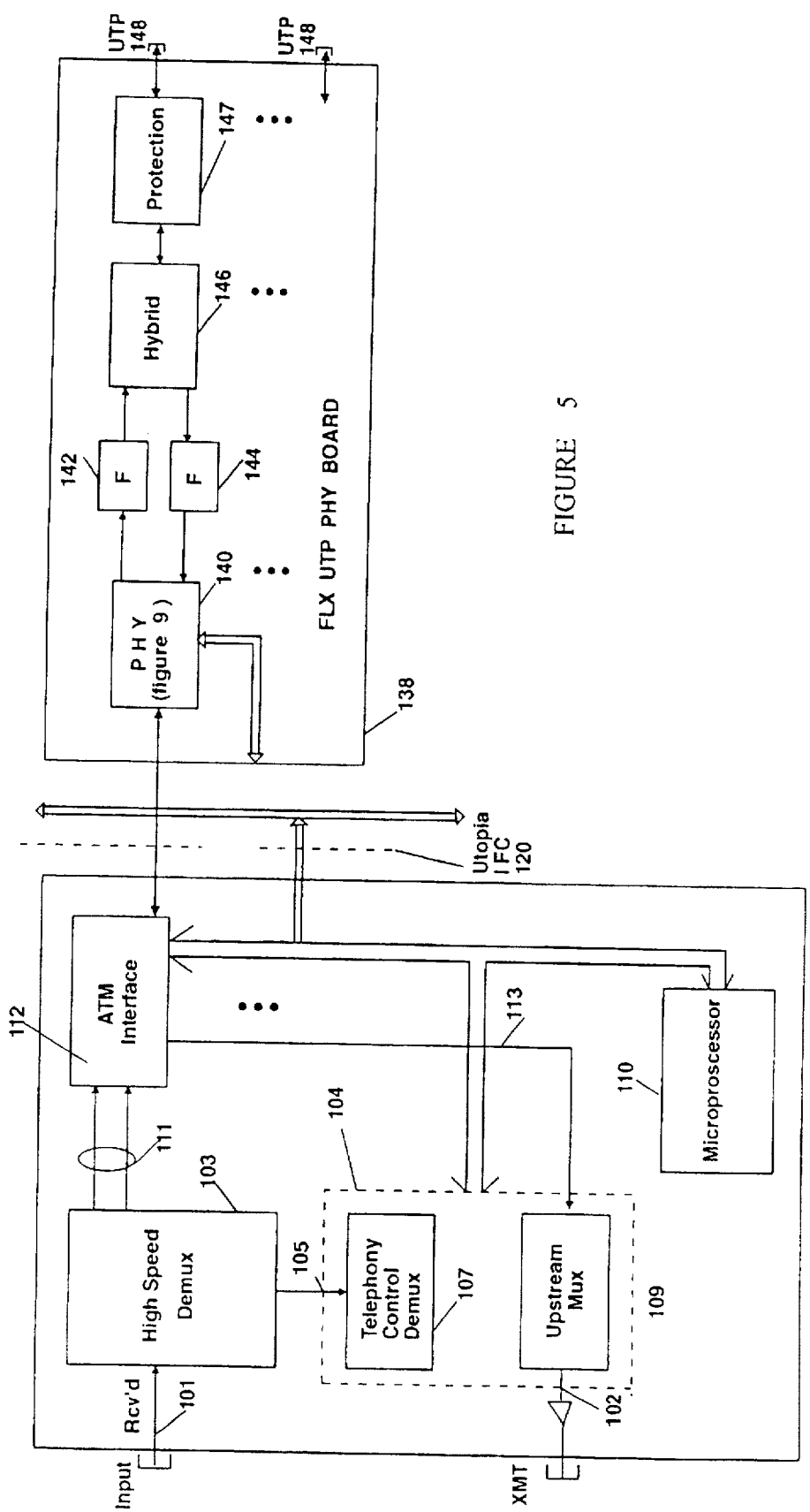
FIG. 5 diagrammatically illustrates portions of the optical network unit of the system of the '247 patent that incorporate modifications according to the present invention to provide for an ATM cell-embedded STS signalling format.

FIG. 5 diagrammatically illustrates portions of the optical network unit of the system of the '247 patent that incorporate transceiver modifications according to the present invention to provide for an ATM cell-embedded signalling format. The optical fiber input end to the optical network unit, which is interfaced with an optical receiver coupled to the downlink fiber link 24 from the splitter site 23, is applied as an input 101 to a high speed demultiplexer 103, which is operative to demultiplex a telephony/control channel over link 105 to a telephony/control demultiplexer portion 107 of a mux/demux unit 104, and ATM cells over links 111 to an ATM interface 112. ATM interface 112 provides return or upstream directed signalling over link 113 to an upstream multiplexer portion 109 of mux/demux unit 104. ATM interface 112 then passes these cells via a UTOPIA interface 120 to a physical interface board 138 containing a plurality of (e.g. eight) PHY units 140, as will be described.

In addition to routing the signalling cells to the upstream multiplexer 109, ATM interface 112 makes the supervisory information available to microprocessor 110. The upstream multiplexer portion 109 of mux/demux unit 104 has an output port 102 coupled to an optical transmitter source for driving the uplink transmit fiber 25 to splitter site 23.

Figure 6:
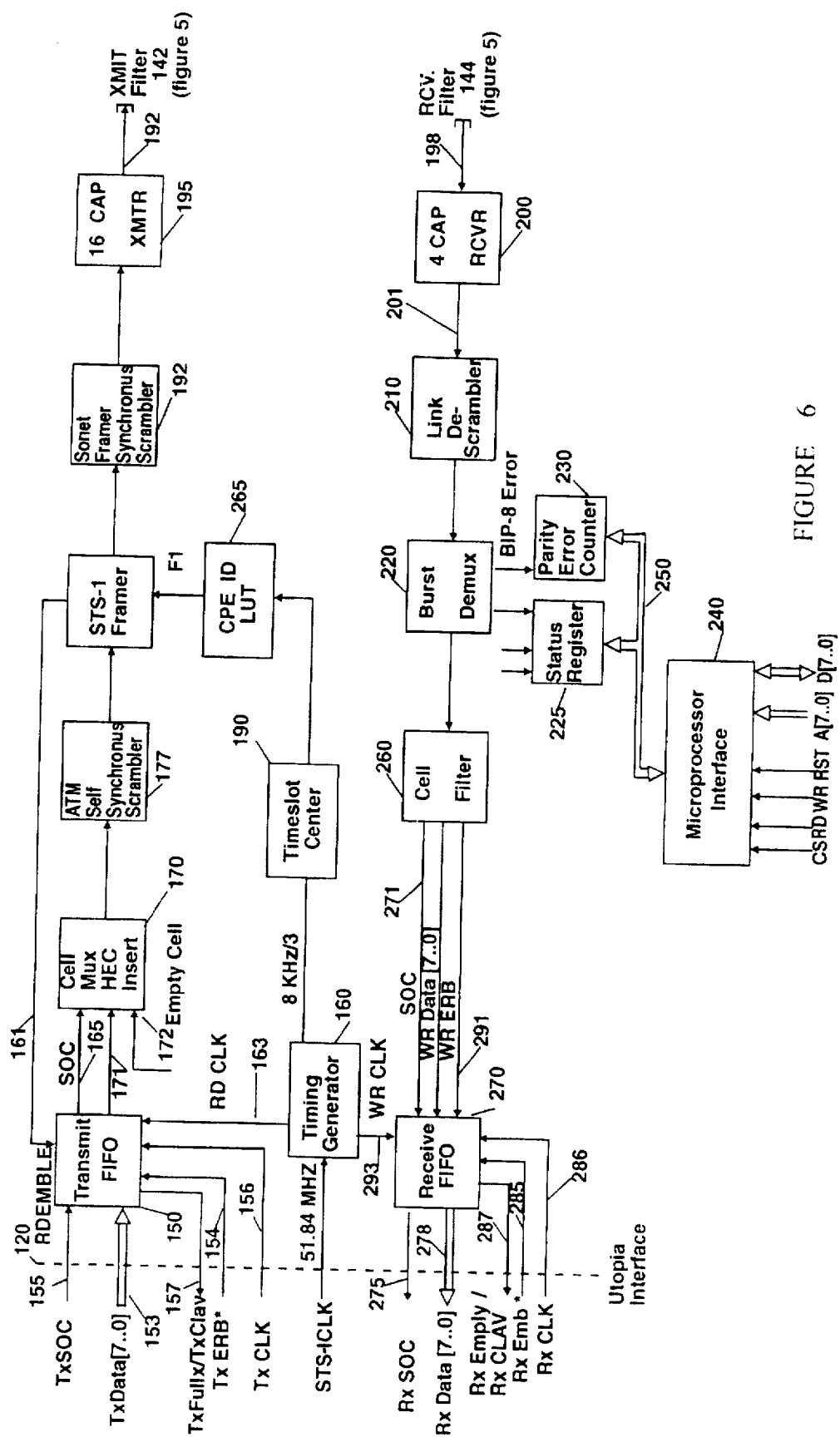
FIG. 6 diagrammatically illustrates the configuration of a PHY unit 140 of FIG. 5.

Within physical interface board 138, PHY unit 140, shown in detail in FIG. 6, to be described, is coupled to UTOPIA interface 120 and is operative to provide a physical interface for ATM cell streams. PHY unit 140 provides an electrical interface, framing, synchronization and access protocols. PHY unit 140 is bidirectionally coupled through respective filters 142 and 144 to a hybrid circuit 146. Filter 142 is operative to reject noise and interference in the received signal, while filter 144 is operative to band-limit the transmit signal. Hybrid circuit 146 is operative to allow two-way transmission over a single unshielded twisted pair (UTP) 148. Hybrid circuit 146 is ported to UTP 148 through a lightning protection and power cross protection circuit 147 to prevent damage to circuit components from external sources.

Referring to FIG. 6 the configuration of a respective PHY transceiver unit is diagrammatically illustrated as comprising a rate-adaptive, transmit (Tx) first-in, first-out elastic buffer (FIFO) 150 to which the incoming broadband services ATM data stream from the UTOPIA interface 120 is coupled via transmit data link 153. Transmit FIFO buffer 150 is operative to accommodate bursty data arrivals and different data rates. It is read out at a rate related to the ports's output data rate. A transmit Tx start of cell (SOC) signal is coupled to transmit buffer 150 via TxSOC link 155. Transmit enable and transmit clock signals are coupled to FIFO 150 via links 154 and 156, respectively. A transmit full link 157 is employed to indicate when the transmit FIFO 150 is full.

Respective read enable and read clock signals are coupled to buffer 150 via links 161 and 163. The read clock is sourced from a timing generator 160, while the read enable signal is derived from an STS-1 framing unit 180. Timing generator 160 is coupled to receive an STS-1 reference 51.84 MHz clock from the UTOPIA interface. A 2:1 cell multiplexer 170 is coupled to receive the SOC signal via link 165, while a first input 171 of multiplexer 170 is coupled to receive the transmit data from transmit buffer 150. Multiplexer 170 has a second input 172 which is coupled to receive an 'empty' cell stored in an auxiliary store (not shown) should there be no cell queued in the transmit buffer 150. Multiplexer 170 also includes logic to generate and insert a cell header in the form of a header error correction code (HEC) if the cell header is incomplete.

The output 175 of multiplexer 170 is coupled to an ATM self-synchronous scrambler 177 which is operative to scramble the ATM cell payload to prevent false cell detection in the receiver contained in the customer premises equipment. The output of self-synchronous scrambler 177 is coupled to STS-1 framer 180, which is operative to insert the ATM cells into an STS-1 frame, the format of which is shown in FIG. 2, described above. A timeslot counter 190, which is clocked by a subdivided framing clock (8 KHz/3) supplied by timing generator 160, provides a timing signal for the insertion of a user-definable F1 byte into the STS-1 frame. A CPE ID look-up table 265, provisioned over the microprocessor interface 240, and read from based on the timeslot counter value from timeslot counter 190, provides the timeslot assignment value for transmission in the F1 byte.

As described earlier, in accordance with the present invention, the F1 byte is employed as a time slot assignment identifier for the slotted bus return channel from the CPE equipment. The output of STS-1 framer 180 is coupled to a standard SONET frame synchronous scrambler 192, which scrambles the STS-1 frame and couples the scrambled frame to a carrierless amplitude modulation, phase modulation (CAP) encoder 195, such as a 16 CAP encoder, for transmission over the UTP 148 to the customer premises equipment. The output of CAP encoder 195 is coupled over link 197 to the transmit filter 142.

On the receive side of the PHY transceiver unit, the output of the receive filter 144 is coupled over link 198 to a CAP decoder 200, such as a 4 CAP decoder, which is operative to demodulate a received CAP-modulated signal burst from the customer premises equipment during the active slot times on the return, uplink channel. Advantageously, since the data rate of the slotted return burst signal is related to the transmit rate, frequency recovery in the receiver is not required. The return channel burst from the CPE is scrambled and must be descrambled.

For this purpose, the output of the CAP decoder 200 is coupled over link 201 to a descrambler 210, which descrambles the slotted return channel signal and couples the descrambled signal to a burst demultiplexer 220. Burst demultiplexer 220 is operative to demultiplex the ATM cell from the return channel burst overhead. As described above with reference to FIG. 4, the burst overhead contains information relating to transmission supervision.

Demultiplexed portions of the burst header are coupled to associated header data registers, such as a status register 225 and a parity error counter 230, the contents of which are monitored by a control microprocessor interface 240 via a PHY unit processor bus 250. A cell filter 260 discards empty cells to avoid waste of transmission resources. Receive FIFO 270 is also an elastic buffer which is operative to accommodate bursty data arrivals and different data rates. It is read out at a rate related to the ports's output data rate.

A receive start of cell (SOC) signal coupled over line 271 from filter unit 260 is coupled from receive FIFO 270 via an RxSOC link 275. Receive enable and receive clock signals are coupled from the UTOPIA interface to receive FIFO 270 via links 285 and 286, respectively. A receive buffer empty link 287 is employed to indicate when the receive FIFO 270 is empty. Respective write enable and write clock signals are coupled to receive FIFO 270 via links 291 and 293. The write clock WR Clk is sourced from timing generator 160, while the write enable WR en signal is derived from cell filter unit 260. The data is output over link 278.

Figure 7:
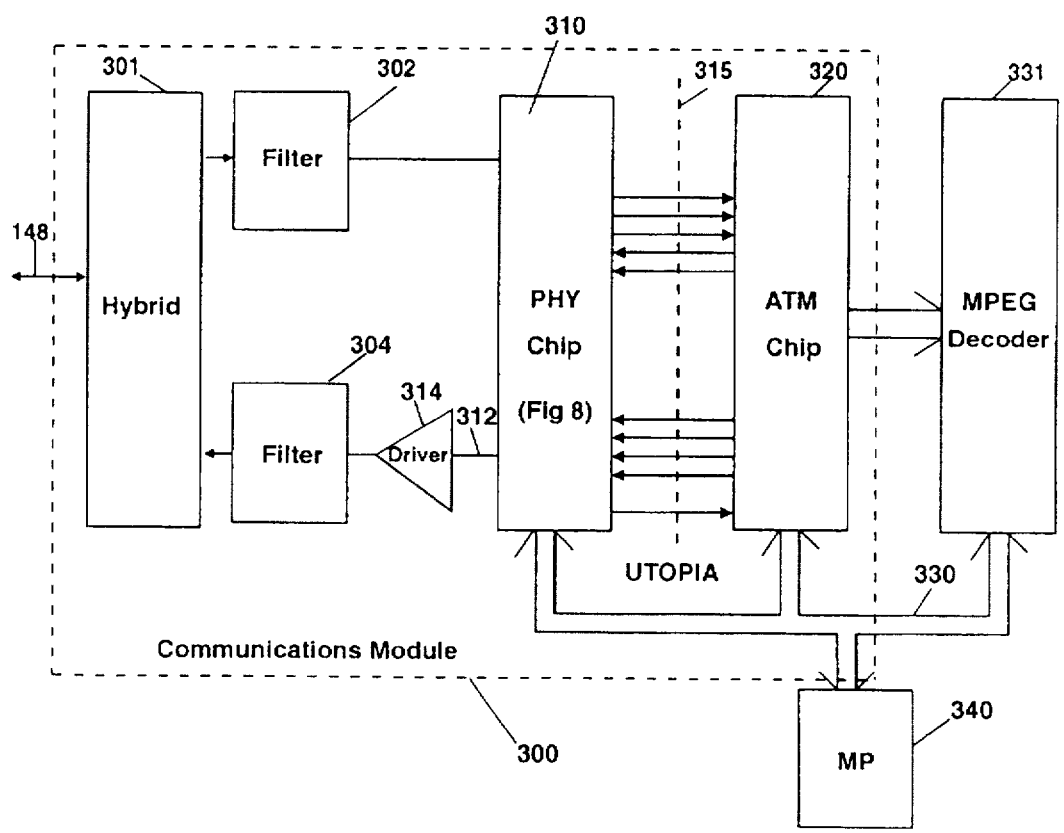
FIG. 7 diagrammatically illustrates the configuration of a communication unit contained in the customer premises equipment, such as a television set top box, that incorporates modifications according to the present invention to provide for ATM cell-embedded STS signalling format.

FIG. 7 diagrammatically illustrates the configuration of a communication unit or module 300 contained in the customer premises equipment, such as a television set top box, that incorporates transceiver modifications according to the present invention to provide for the above-described ATM cell-embedded STS signalling format. At the downlink end of the UTP or coax, the CPE device has a hybrid circuit 301, which is operative to allow two-way transmission over the cable 148. Coupled to hybrid circuit 301 are respective filters 302 and 304. Receive filter 304 is operative to reject out-of-band energy from the received signal, while transmit filter 304 is operative to condition the transmitted signal to prevent out-of-band emissions that could impair the receiver, broadcast services, or inadvertently fail to comply with FCC emission limits.

Figure 8:
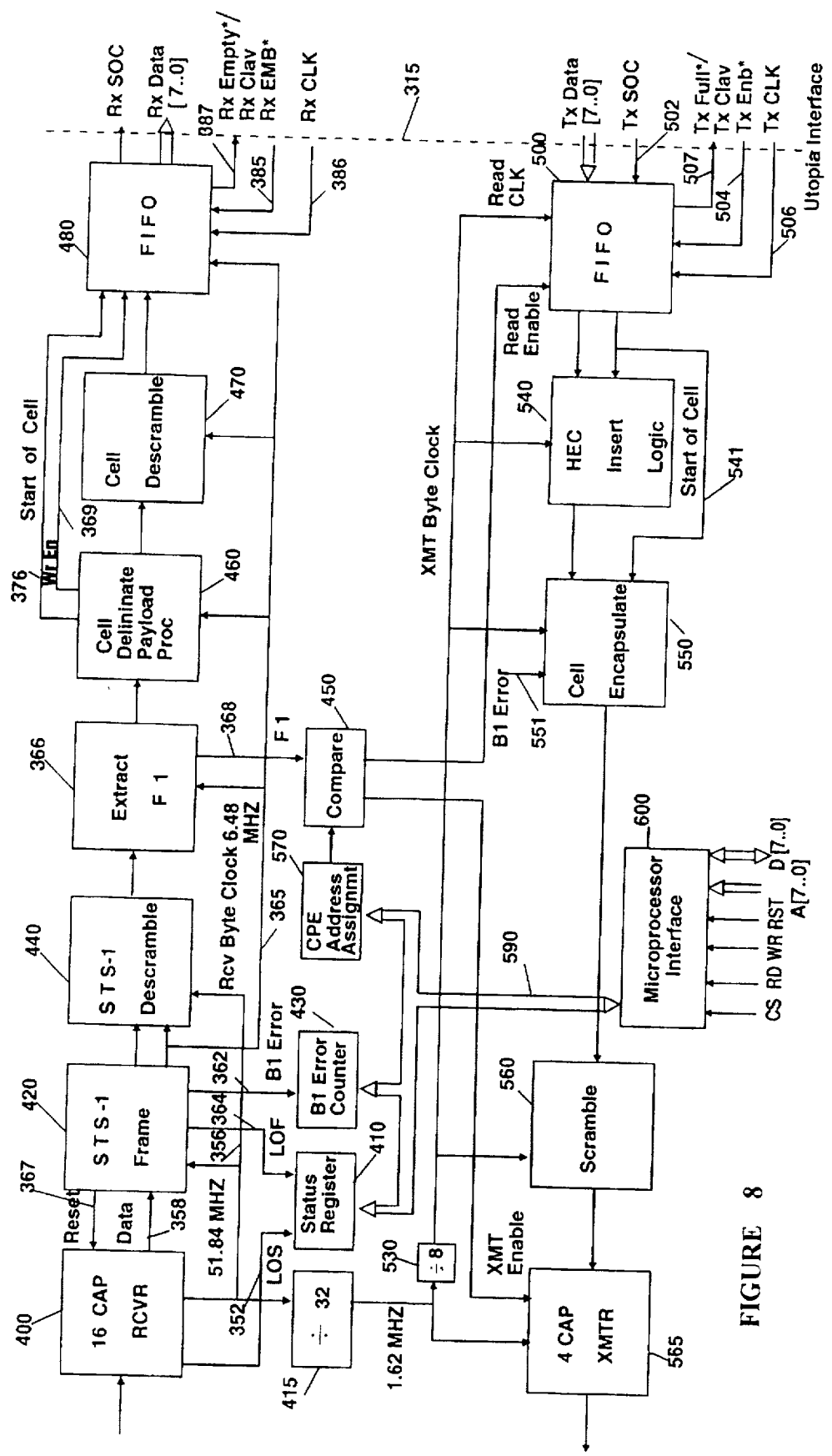
FIG. 8 diagrammatically illustrates the configuration of a respective CPE-resident PHY unit 320 of the CPE communication unit of FIG. 7.

The output of receive filter 302 is coupled to a CPE-resident PHY unit 310, shown in detail in FIG. 8, to be described. PHY unit 310 is coupled via a UTOPIA interface 315 to an ATM signal processing unit 320. PHY unit 310 has a transmit port 312 which is coupled through a driver 314 to transmit filter 304. Each of the PHY unit 310 and the ATM signal processing unit 320 is coupled via a bus 330 to a supervisory control microprocessor 340. The output of the ATM unit 320 is coupled to an MPEG decoder 331, which is also coupled to microprocessor bus 330.

Referring to FIG. 8 the configuration of a respective CPE-resident PHY transceiver unit 320 is diagrammatically illustrated as comprising a CAP decoder 400, here a 16 CAP decoder, which is operative to demodulate the received 16 CAP modulated 51.84 Mb/s broadband data stream from the optical network unit of FIG. 6 on the downlink channel. In the event of a loss of signal (LOS), an LOS signal is coupled over link 352 to a status register 410. The recovered 51.84 MHz clock signal is coupled to downstream circuit components via a recovered clock link 356. It is also coupled to a divide-by-32 divider 415, which generates a 1.62 MHz clock for use in the transmitter portion of the unit.

The received data stream is coupled over link 358 to an STS-1 framer 420, which frames on the received SONET frame and performs a bit interleaved parity (BIP8) check on the data. Any errors are coupled over link 362 to a B1 error counter 430. It also applies reset signal over link 367 to the CAP decoder 400. In the event of loss of frame (LOF), an LOF signal is coupled over link 364 to status register 410.

STS framer 420 is referenced to the recovered clock on link 356, and provides a receive byte clock of 6.48 MHz on link 365 to downstream signal processing components to be described. The scrambled SONET data frame is coupled to an STS-1 descrambler 440, which descrambles the downlink signal and couples the descrambled signal to an F1 byte detector 366, which examines the descrambled STS-1 frame overhead and extracts the F1 byte. The detected F1 byte is coupled over link 368 to a comparator 450, which uses the F1 byte to control the operation of the slotted return channel, as will be described.

The frame is further coupled to a cell payload processor 460, which employs pointers in the STS-1 overhead portion to identify the SONET synchronous payload envelope that contains the actual data payload, diagrammatically illustrated in FIG. 2, described previously. Cell payload processor 460 couples a start of cell (SOC) signal over link 376 to a receive FIFO 480. The data payload is coupled to a cell descrambler 470, which descrambles the cell payload and couples the descrambled payload data to the receive FIFO 480.

Receive FIFO 480 is an elastic buffer that accommodates bursty data arrivals and different data rates. It is read out at a rate related to the ports's output data rate. Receive enable and receive clock signals are coupled from the UTOPIA interface 315 to receive FIFO 480 via links 385 and 386, respectively. A receive buffer empty link 387 is employed to indicate when the receive FIFO 480 is empty. Respective write enable and write clock signals are coupled to receive FIFO 480 via links 369 and 365, respectively.

A rate-adaptive, transmit FIFO 500 is coupled to receive ATM cells from the UTOPIA interface 315. A transmit Tx start of cell (SOC) signal is coupled to transmit buffer 500 via TxSOC link 502. Transmit enable and transmit clock signals are coupled to FIFO 500 via links 504 and 506, respectively. A transmit full link 507 is employed to indicate when the transmit FIFO 500 is full. Respective read enable and read clock signals are coupled to transmit buffer 500 via links 511 and 513. The read clock is sourced from a divide-by-eight divider 530 which is coupled to divide-by-32 divider 415, while the read enable signal is derived from comparator 450.

The data output path of FIFO 500 is coupled to a logic circuit 540 which, like multiplexer 170 in the optical network unit PHY unit, is operative to generate and insert a cell header in the form of a header error correction code (HEC). The start of cell SOC signal is coupled over link 541 to HEC insertion logic circuit 540 and to a cell encapsulation unit 550, which assembles an uplink return time slot including the overhead shown in FIG. 4, described above. A bit error link 551 is coupled to cell encapsulation unit 550 as part of the performance monitoring status byte that contains information relating to the condition of the CPE.

The output of cell encapsulation unit 550 is coupled to an ATM self-synchronous scrambler 560, which scrambles the ATM cell payload to prevent false cell detection in the receiver contained in the customer premises equipment. The output of self-synchronous scrambler 560 is coupled to a CAP-4 encoder 565, which is clocked by the 1.62 MHz clock output of divide-by-32 divider 415, and is enabled by a transmit enable signal supplied over link from comparator 450.

As described earlier, in accordance with the present invention, the F1 byte is employed as a time slot assignment identifier for the slotted bus return channel from the CPE equipment, with the detected F1 byte being coupled over link 368 to comparator 450. In response to detecting the F1 byte comparator provides a transmit enable signal to control the time of occurrence of the return time slot on the uplink channel. Thus, the 4 CAP uplink slotted transmissions occur in bursts that are synchronized or referenced to the detected F1 byte in the downlink STS-1 frame.

The time of occurrence of the transmit enable signal generated by comparator 450 is derived by slot assignments stored in an associated time slot assignment table 570, which is provisioned by microprocessor interface 600, via microprocessor bus 590, which is also coupled to status register 410 and B1 error counter 430. As pointed out above, the output of 4 CAP encoder 565 is coupled through driver 314 to transmit filter 304 for application to hybrid circuit 300.

Acquisition of the initial time slot may be accomplished, for example, by setting aside one of the 64 time slots of the example of FIG. 4 to initial time slot contention, using an Aloha contention scheme. Setting aside a time slot for contention prevents a just-connected CPE from interfering with an already in-service CPE. Once the newly attached CPE acquires a time slot, then that assigned time slot may by used to request additional time slots as needed. These management functions may be accomplished by way of an external processor, using microprocessor interface 600.

Figure 9:
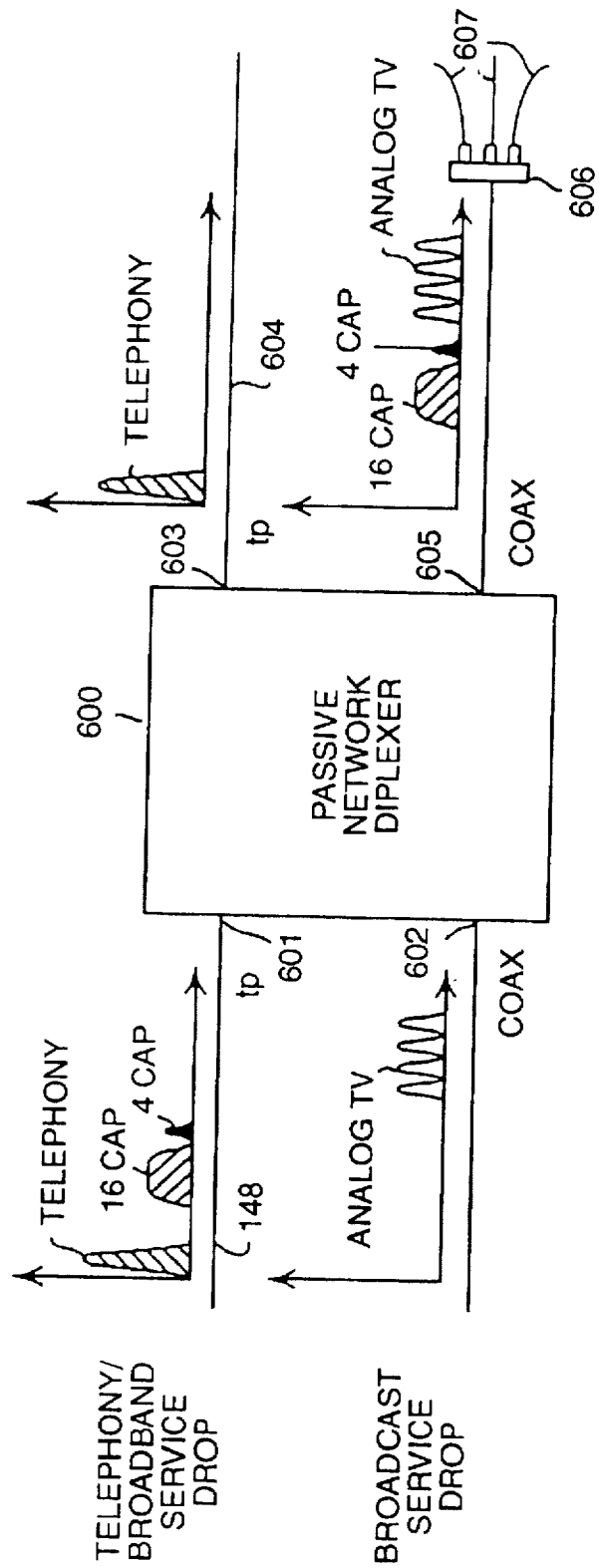
FIG. 9 diagrammatically illustrates the manner in which the unshielded twisted pair link from an optical network unit may be interfaced with telephony and cable television signalling ports typically provided at or near a customer premise.

FIG. 9 diagrammatically illustrates the manner in which the (unshielded twisted pair) link from the optical network unit may be interfaced with telephony and cable television signalling ports typically provided at a customer premise. As shown therein, a frequency diversity diplexer 600 has a first upstream port 601, to which the UTP 148 from the optical network unit is connected, and a second upstream port 602, to which coaxial cable used by a cable television service provider to deliver analog cable television signals to the customer premise is connected. Diplexer 600 may also include a first downstream, telephony signal port 603, to which a twisted pair 604 for customer premises telephone equipment may be connected. Diplexer 600 also contains a second downstream, coaxial cable port 605, to which a television set top box or standard cable-ready television set may be connected.

Figure 10:
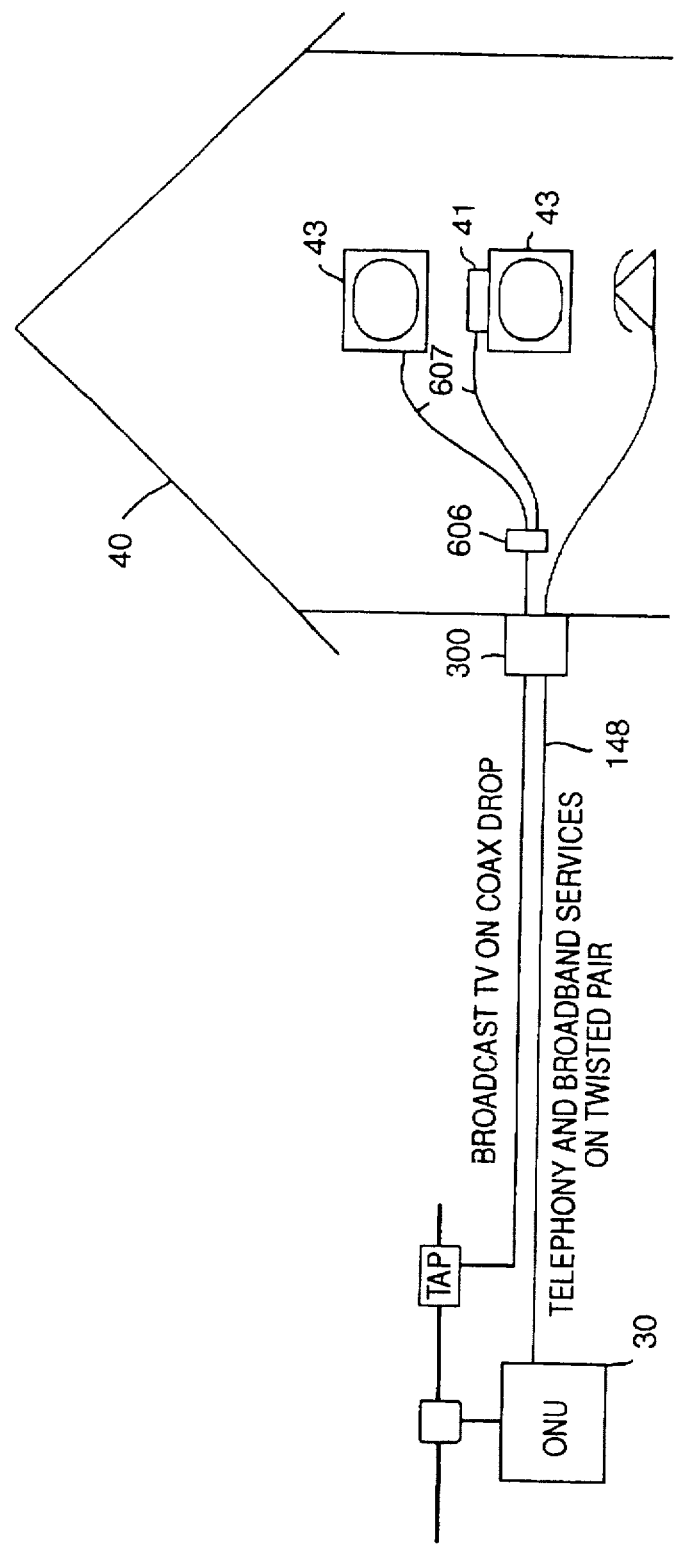
FIG. 10 diagrammatically illustrates the coupling of the diplexer of FIG. 9 to a coaxial cable fan-out connector unit, which provides multiple coaxial cable feeds to more than one piece of customer equipment, such as a set top box, VCR and a cable-ready television set.

As shown by the frequency spectra separation diagrams associated with its respective upstream and downstream ports, diplexer 600 is operative to couple both downstream-directed 16 CAP modulated STS-1 based communication signals received over the unshielded twisted pair 148 from the optical network interface and applied to port 601 and analog cable television signals applied to coaxial cable port 602 to (broadband) coaxial cable output port 605. Coaxial cable output port 605 is shown as being coupled to a coaxial cable fan-out connector unit 606, which provides multiple coaxial cable feeds 607 to more than one piece of customer equipment, such as a set top box, VCR and a cable-ready television set, as diagrammatically illustrated in FIG. 10. Diplexer 600 is also operative to couple telephony signals received over the link to the downstream telephony signal port 603.

Figure 11:
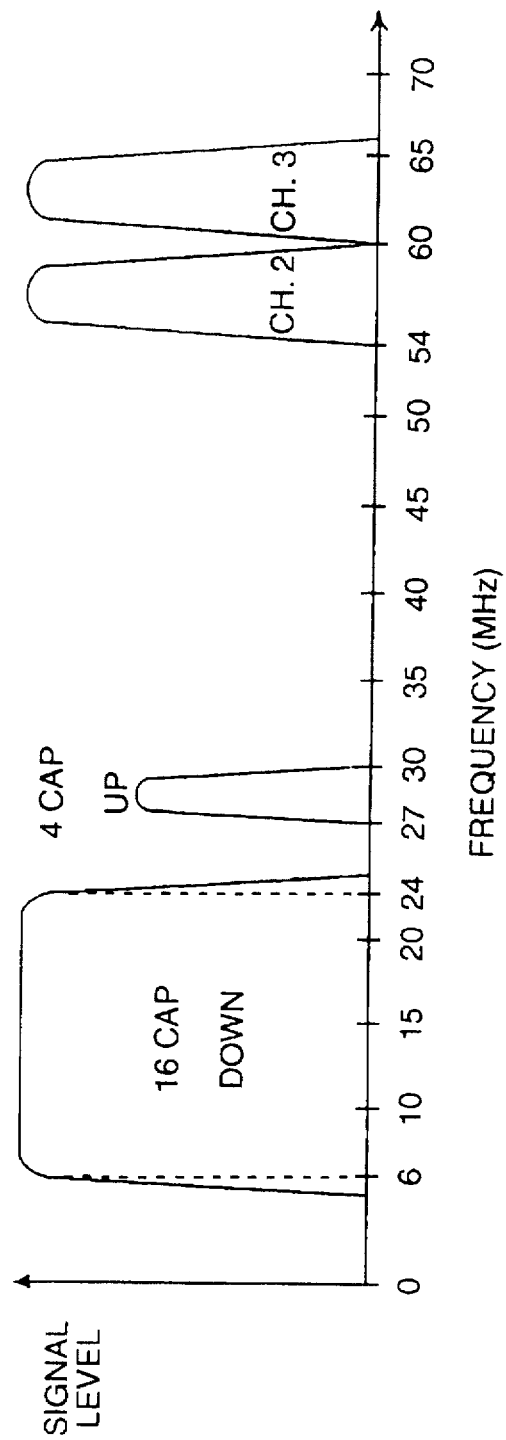
FIG. 11 shows the frequency spectrum separation of downlink directed 16 CAP and upstream-directed 4 CAP STS-1 based communication signals, and their dual separation below the band of analog cable television signals supplied by a cable television service provider.

In the upstream direction, diplexer 600 is operative to couple both upstream-directed 4 CAP modulated STS-1 based communication signals applied to coaxial cable port 605 from the CPE-resident PHY unit of a set top box and telephony signals applied to port 603 to the unshielded twisted pair 148 to which upstream port 601 is connected. FIG. 11 shows the frequency spectrum separation of downlink directed 16 CAP and upstream-directed 4 CAP ATM based communication signals, and their dual separation below the band of analog cable television signals supplied by a cable television service provider to diplexer coaxial cable port 602.

As will be appreciated from the foregoing description of the modification of the broadband communication system described in the '247 patent, through which each of the optical network unit and a set-top box associated with customer premises equipment of the system of the '247 patent is modified as described to provide for an ATM cell-embedded STS signalling format, the F1 byte, that is provided with the section overhead of an STS-1 frame, may be used for a return channel timing reference. Thus, the present invention is capable of extending the use of internationally accepted standard communication protocols, specifically, the use of a point-to-multipoint asynchronous transfer mode (ATM) transport standard, in which an ATM cell-encapsulated STS-based signal is broadcast to a plurality of customer premises equipments.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a broadband communication system for conveying telecommunication messages over a broadband communication path from a master site to one or more remote sites, and from said one or more remote sites to said master site, said one or more remote sites being coupled over a communication link to a broadband communication path interface device which is ported to said broadband communication path, a method of conveying broadband information signals, that have been downlinked from said master site to said broadband communication path interface device, from said broadband communication path interface device to said one or more remote sites, and for conveying message signals from said one or more remote sites to said broadband communication path interface device, so that said message signals may be transmitted to said master site, said method comprising the steps of:

(a) at said broadband communication path interface device, assembling a first message for transmission to one or more remote sites, said first message having a data portion that contains broadband information signals destined for said one or more remote sites and an overhead portion that contains a return channel transmission opportunity control code representative of an uplink return channel transmission opportunity for a remote site to transmit a message on said uplink return channel, and transmitting said first message from said broadband communication path interface device over a multi-drop communication link to said one or more remote sites; and (b) at a destination remote site, detecting said return channel transmission opportunity control code contained in said overhead portion of said first message received thereby, assembling a second message intended for transmission to said broadband communication path interface device, and transmitting said second message during a portion of a time division slotted return channel of said multi-drop communication link to said broadband communication path interface device in accordance with the detected return channel transmission opportunity control code of said first message.

2. A method according to claim 1, wherein said first message is comprised of synchronous optical network based communication signals.

3. A method according to claim 1, wherein step (a) comprises incorporating said broadband information signals as first fixed size data cells together with said return channel transmission opportunity control code into said first message and transmitting said first message from said broadband communication path interface device over said multi-drop communication link to said one or more remote sites.

4. A method according to claim 3, wherein said first fixed size data cells comprise asynchronous transfer mode data cells.

5. A method according to claim 4, wherein said first communication signals comprise synchronous optical network based communication signals.

6. A method according to claim 3, wherein step (b) includes assembling second fixed sized data cells into said second message.

7. A method according to claim 6, wherein said second fixed size data cells comprise asynchronous transfer mode data cells.

8. A method according to claim 1, wherein said one or more remote sites corresponds to a single remote site at which customer premises broadband communication receiver equipment is installed.

9. A method according to claim 1, wherein said one or more remote sites corresponds to a plurality of remote sites at which respective customer premises broadband communication receiver equipments are installed.

10. A method according to claim 1, wherein step (a) includes inserting respectively different return slot-representative return channel transmission opportunity control codes associated with respectively different remote sites into a common overhead portion of successive first messages, and wherein step (b) comprises, at respectively different ones of said remote sites, detecting said respectively different return channel transmission opportunity control codes contained in said common overhead portion of said first messages received thereby, and transmitting second messages during respectively different portions of said time division slotted return channel of said multi-drop communication link in accordance with said detected return channel transmission opportunity control codes.

11. A method according to claim 1, wherein step (a) comprises transmitting said first message in a first frequency band below that assigned for broadcast cable television signals, and step (b) comprises transmitting said second message in a second frequency band below that assigned for broadcast cable television signals and spaced apart from said first frequency band.

12. A method according to claim 11, wherein said destination remote site further includes a coaxial cable port, to which cable television signals from a cable television service provider may be supplied, and a telephony signalling port, to which customer premises telephone equipment at said destination remote site may be connected, and wherein step (b) further includes coupling a diplexer filter with said coaxial cable port and said multi-drop communication link, said diplexer filter being operative to couple said first message received over said multi-drop communication link and cable television signals at said coaxial cable port to a broadband output port, and to couple telephony signals received over said multi-drop communication link to said telephony signalling port.

13. A method according to claim 11, wherein step (a) comprises transmitting said first message as first carrierless amplitude modulation phase modulation signals, and step (b) comprises transmitting said second message as second carrierless amplitude modulation phase modulation signals.

14. A method according to claim 1, wherein said multi-drop communication link comprises an unshielded twisted pair.

15. For use with a broadband communication system for conveying telecommunication messages over a broadband communication path from a master site to one or more remote sites, and from said one or more remote sites to said master site, said remote sites being coupled over a multi-drop communication link to a broadband communication path interface device which is ported to said broadband communication path, an arrangement for conveying broadband information signals, that have been downlinked from said master site to said broadband communication path interface device, from said broadband communication path interface device to said one or more remote sites, and for conveying return message signals from said one or more remote sites to said broadband communication path interface device, so that said return message signals may be transmitted to said master site, comprising:

an upstream transceiver, provided in said broadband communication path interface device and being operative to generate a first message having a data portion that contains broadband information signals destined for said one or more remote sites and an overhead portion that contains a return channel transmission opportunity control code representative of an uplink return channel transmission opportunity for a remote site to transmit a message on said uplink return channel, said upstream transceiver transmitting said first message from said broadband communication path interface device over a multi-drop communication link to said one or more remote sites; and a downstream transceiver, provided at a respective destination remote site, and being operative to detect a respective return channel transmission opportunity control code contained in said overhead portion of said first message received thereby, said downstream transceiver assembling a second message and transmitting said second message from said respective destination remote site during a portion of a time division slotted return channel of said multi-drop communication link to said upstream transceiver in said broadband communication path interface device in accordance with the detected return channel transmission opportunity control code of said first message.

16. An arrangement according to claim 15, wherein said first message is comprised of synchronous optical network based communication signals.

17. An arrangement according to claim 15, wherein said upstream transceiver is operative to insert said broadband information signals as first fixed size data cells together with said return channel transmission opportunity control code into said first message and to transmit said first message from said broadband communication path interface device over said multi-drop communication link to said one or more remote sites.

18. An arrangement according to claim 17, wherein said first fixed size data cells comprise asynchronous transfer mode data cells.

19. An arrangement according to claim 18, wherein said first message is comprised of synchronous optical network based communication signals.

20. An arrangement according to claim 19, wherein said downstream transceiver is operative to assemble second fixed sized data cells into said second message.

21. An arrangement according to claim 20, wherein said second fixed size data cells comprise asynchronous transfer mode data cells.

22. An arrangement according to claim 15, wherein said one or more remote sites corresponds to a single remote site.

23. An arrangement according to claim 15, wherein said one or more remote sites comprises a plurality of remote sites.

24. An arrangement according to claim 15, wherein said upstream transceiver is operative to insert respectively different return slot-representative control codes associated with respectively different remote sites into a common overhead portion of successive first messages, and wherein plural downstream transceivers are provided at respectively different remote sites, and are operative to detect said respectively different return channel transmission opportunity control codes contained in said common overhead portion of said first messages received thereby, and transmit second messages during respectively different portions of said time division slotted return channel of said multi-drop communication link in accordance with said detected return channel transmission opportunity control codes.

25. An arrangement according to claim 15, wherein said upstream transceiver is operative to transmit said first message in a first frequency band below that assigned for broadcast cable television signals, and wherein said downstream transceiver is operative to transmit said second message in a second frequency band below that assigned for broadcast cable television signals and spaced apart from said first frequency band.

26. An arrangement according to claim 25, wherein said destination remote site further includes a coaxial cable port, to which cable television signals from a cable television service provider may be supplied, and a telephony signalling port, to which customer premises telephone equipment at said destination remote site may be connected, and further including, at said destination remote site, a diplexer filter coupled with said coaxial cable port and said multi-drop communication link, said diplexer filter being operative to couple said first message received over said multi-drop communication link and cable television signals at said coaxial cable port to a broadband output port for application to said downstream transceiver, and to couple telephony signals received over said multi-drop communication link to said telephony signalling port.

27. An arrangement according to claim 26, wherein said upstream transceiver is operative to transmit said first message as first carrierless amplitude modulation phase modulation signals, and wherein said downstream transceiver is operative to transmit said second message as second carrierless amplitude modulation phase modulation signals.

28. An arrangement according to claim 15, wherein said multi-drop communication link comprises an unshielded twisted pair.

29. An arrangement according to claim 15, wherein said upstream transceiver is operative to receive said second message transmitted by said downstream transceiver, and to forward said second message over said broadband communication path to said master site.

30. An arrangement according to claim 15, wherein said upstream transceiver is operative to receive said second message transmitted by said downstream transceiver, and to forward first selected message signals contained therein over said broadband communication path to said master site, and to extract second selected message signals contained therein for use by said broadband communication path interface device.

* * * * *